United States Patent [19]

Ferran et al.

[11] Patent Number: 4,823,603
[45] Date of Patent: Apr. 25, 1989

[54] CAPACITANCE MANOMETER HAVING STRESS RELIEF FOR FIXED ELECTRODE

[75] Inventors: Robert J. Ferran, La Jolla; Gordon E. Osterstrom, Spring Valley, both of Calif.

[73] Assignee: Vacuum General, Inc., San Diego, Calif.

[21] Appl. No.: 189,780

[22] Filed: May 3, 1988

[51] Int. Cl.4 ............................ G01L 7/08; G01L 9/12
[52] U.S. Cl. ........................................ 73/724; 73/708; 361/283
[58] Field of Search ....................... 73/718, 724, 708; 361/283

[56] References Cited

U.S. PATENT DOCUMENTS

| 2,751,530 | 6/1956 | Armstrong | 361/283 |
| 3,557,621 | 1/1971 | Ferran | 73/718 |
| 4,380,041 | 4/1983 | Ho | 73/718 |
| 4,587,851 | 5/1986 | Mortberg | 73/724 |
| 4,703,658 | 11/1987 | Mrozack, Jr. | 73/724 |

Primary Examiner—Donald O. Woodiel
Attorney, Agent, or Firm—Knobbe, Martens, Olson & Bear

[57] ABSTRACT

An improved capacitance manometer includes a thin, electrically conductive diaphragm fixedly mounted to a housing. The diaphragm separates a first chamber that is subjected to a reference pressure from a second chamber that is subjected to a pressure that is to be measured relative to the reference pressure. The diaphragm flexes in response to a pressure differential between the two chambers. The diaphragm comprises one electrode of a variable capacitor. A second electrode of the variable capacitor is provided by a fixed electrically conductive area mounted on a ceramic disc or other fixed electrode support. The ceramic disc is mounted within the housing so that the electrically conductive area on the ceramic disc is proximate to and spaced apart from the diaphragm in generally parallel relationship to the diaphragm when the diaphragm is in a substantially relaxed condition (i.e., not flexed by a pressure differential). In order to prevent the ceramic disc and its associated conductive area from bending as the temperature changes, the ceramic disc is mechanically isolated from the housing by a roller bearing structure that preferably is a spherical or cylindrical electrical insulator. The roller bearing structure allows the ceramic disc to move with respect to the housing to prevent temperature induced forces that would otherwise cause bending. The roller bearing structure provides the additional advantage of significantly reducing leakage current through the ceramic disc that would otherwise affect the accuracy of measurements made with the capacitance manometer.

17 Claims, 5 Drawing Sheets

CAPACITANCE MANOMETER HAVING STRESS RELIEF FOR FIXED ELECTRODE

FIELD OF THE INVENTION

The present invention is in the field of measuring devices utilizing a variable capacitance to detect the movement of one electrode with respect to another electrode, and, more particularly, is in the field of capacitance diaphragm gauges for measuring pressure.

BACKGROUND OF THE INVENTION

In a system having liquids or gasses that must be maintained within a predetermined pressure range, it is necessary to accurately measure the pressure. Numerous devices are available to measure pressure. Some devices indicate pressure while others act as transducers by converting the measured pressure to a calibrated quantity to be transmitted to another system. For example, in a system which utilizes electronic circuits to automatically control the pressure, it is desirable to provide an electrical representation of the pressure that can be provided as an input to the electronic circuitry. One such device that is used to generate an electrical representation of the pressure is a capacitance manometer, or capacitance diaphragm gauge.

An exemplary capacitance manometer is described in U.S. Pat. No. 3,557,621, issued on Jan. 26, 1971. Briefly, such a capacitance manometer has a diaphragm comprising an electrically conductive material that is supported along the periphery of the diaphragm by a housing or other such support structure. Typically, the housing is constructed from an electrically conductive metal so that the housing provides an electrically conductive path to the diaphragm. The diaphragm, which functions as one electrode of a capacitor, is positioned proximate to at least one reference electrode, which, as described in U.S. Pat. No. 3,557,621, is preferably fixed. For example, the fixed reference electrode is advantageously mounted on a ceramic disc substrate which is itself mounted to the housing.

One side of the diaphragm is exposed to a known or reference pressure and the other side of the diaphragm is exposed to an unknown, variable pressure that is to be measured. A differential in the pressure between the two sides of the diaphragm cause the center of the diaphragm to move in the direction of the lower of the two pressures and thus causes the diaphragm to develop a curvature. Such movement and resulting curvature causes the center of the diaphragm to move closer to or further from the fixed reference electrode of the capacitor and thus causes a corresponding change in the capacitance between the two electrodes. The capacitance between the two electrodes can be monitored, for example, by the circuit shown in FIG. 2 of U.S. Pat. No. 3,557,621, to thereby detect the movement of the diaphragm and thus detect changes in the pressure. The electrical output signal of the circuit can be measured by known devices and calculations performed on the measured signal value to provide an indication of the pressure differential.

The capacitance manometer described above is a high impedance device that operates with very small currents. Therefore, any leakage currents caused by moisture in the device, stray capacitances, and the like, can cause inaccuracies in the measurements. As set forth in U.S. Pat. No. 3,557,621, the fixed reference electrode of the variable capacitor is advantageously surrounded by a conductive guard ring that is typically concentric with the fixed reference electrode. A signal of substantially the same instantaneous voltage and phase as detected on the fixed reference electrode is applied to the conductive guard ring so as to effectively block leakage currents between the diaphragm (i.e., the movable electrode) and the fixed reference electrode. By blocking the leakage currents, the accuracy of the measurements obtained from the capacitance manometer is significantly increased, particularly with respect to the measurement of small pressure differentials wherein the movement of the diaphragm is relatively small. For example, capacitance manometers have been constructed that measure pressure differentials as small as approximately $10^{-9}$ atmospheres.

It has been found that the accuracy of a variable capacitance manometer, such as described in U.S. Pat. No. 3,557,621, can vary substantially in response to changes in the temperature to which the manometer is exposed. One such temperature effect is caused by the differential expansion and contraction of the fixed electrode support (e.g., a ceramic disc) on which the fixed reference electrode is supported with respect to the metallic housing of the manometer. For example, in exemplary capacitance manometers, the fixed electrode is mounted on a ceramic disc having a different coefficient of thermal expansion than the metallic housing. The differential expansion and contraction causes a relative movement of the fixed electrode support and the fixed reference electrode with respect to the metallic housing by causing the fixed electrode support and the fixed electrode to bend and develop a curvature. Thus, the center of the fixed reference electrode may move closer to or further away from the diaphragm as a result of a change in the temperature. The movement of the fixed reference electrode due to temperature causes a change in the capacitance that is indistinguishable from the change in capacitance due to changes in the capacitance caused by changes in pressure. Furthermore, it has been found that the effect of temperature changes are not predictable since the relative movement of the fixed electrode support with respect to the metallic housing typically does not repeat itself as the temperature increases and decreases. Thus, changes in the temperature cause spurious capacitance changes that affect the accuracy of the measurements. In order to prevent the temperature related changes in capacitance, it is desirable to reduce the relative movement of the fixed electrode support with respect to the metallic housing.

Another problem that continues to exist with respect to commercially available capacitance manometers is a small amount of residual stray capacitance. These stray capacitances exist for example between the fixed reference electrode and the metallic housing wherein the ceramic material of the fixed electrode support acts as a dielectric between the fixed reference electrode and the housing. Similar stray capacitances exist between the guard ring and the metallic housing. Although the guard ring substantially reduces the stray capacitances through the fixed electrode support to the metallic housing, heretofore, it has not been feasible to completely eliminate the stray capacitances. For example, the stray capacitances have been reduced to approximately 1 picofarad in one known commercially available capacitance manometer. The stray capacitances also vary in accordance with changes in temperature and thus introduce another uncontrolled variable into the measurements obtained using a capacitance manometer. Thus, it is desirable to further reduce the stray capacitances.

SUMMARY OF THE INVENTION

The present invention provides a solution to the foregoing problems with spurious capacitance changes caused by temperature and stray capacitances caused by leakage currents through the dielectric ceramic material.

The present invention is a variable capacitance measuring device that is responsive to a variable parameter. The measuring device comprises a housing. A first electrode is secured to the housing. The first electrode is reciprocally movable along a first axis within the housing in response to changes in the variable parameter. A second electrode is also included within the housing. The second electrode is spaced apart from the first electrode so that the first and second electrodes form a capacitor. The second electrode is mounted on the surface of an insulator. A roller is interposed between the insulator and the housing. The roller is positioned so that the insulator and the second electrode are substantially immovable with respect to the first electrode in a direction along the first axis. The roller permits free movement of the second electrode and the insulator in a plane perpendicular to the first axis, thus avoiding the development of curvature of the fixed reference electrode.

In the preferred embodiment described herein, the variable capacitance measuring device is a capacitance manometer. The first electrode is a diaphragm secured to the housing. The diaphragm separates a first cavity within the housing from a second cavity within the housing. The first cavity has a first pressure and the second cavity has a second pressure. The variable parameter measured by the device is the differential pressure between the first and second cavities. At least a portion of the diaphragm moves along the first axis in a direction toward the second electrode when a selected one of the first and second pressures increases relative to the other of the first and second pressures. The same portion of the diaphragm moves along the first axis in a direction away from the diaphragm when the selected one of the first and second pressures decreases relative to the other of the first and second pressures.

In particularly preferred embodiments of the present invention, fixed reference electrode support is a ceramic insulating disc having a peripheral rim portion forming a shoulder around an electrode support surface. The shoulder is juxtaposed with a corresponding shoulder on the housing. The two shoulders are separated by the cylindrical roller bearings. The cylindrical roller bearings have axes of symmetry axes that are positioned perpendicular to a radial line extending from the center of the electrode support so that the cylindrical roller bearings roll freely as the electrode support expands or contracts with temperature. Preferably, the roller bearings comprise a hard insulating material, such as sapphire (crystalline aluminum oxide). Thus, the electrode support is electrically as well as mechanically isolated from the housing.

The roller bearings of the present invention provide a low friction mounting between the fixed electrode support and the housing. The roller bearings permit the fixed electrode support to expand and contract at a rate that differs from the rate of expansion and contraction of the housing without causing the fixed electrode support to deform because of friction forces as can occur in the prior art devices. Furthermore, the roller bearings insulate the fixed electrode support from the metallic housing so that the metallic housing does not act as an additional capacitance electrode on the fixed electrode support.

These and other features will be described more fully in connection with the detailed description of the preferred embodiment which follows.

DETAILED DESCRIPTION OF THE PREFERRED EMBODIMENT

In order to better understand the problems solved by the present invention, the structure and operation of an exemplary known capacitance manometer will first be described.

Figure 1:
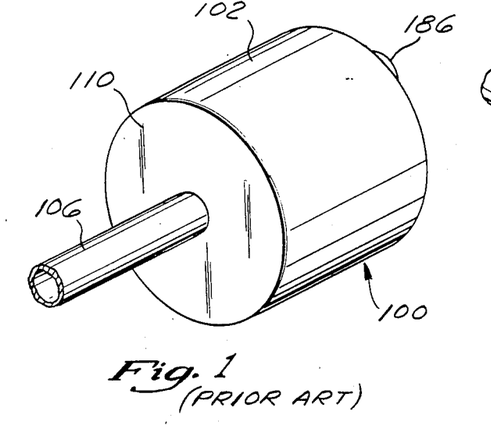
FIG. 1 is a perspective view of an assembled capacitance manometer in accordance with the prior art showing the outer shell and the hollow pressure tube for connecting the manometer to a source of pressure.
Figure 2:
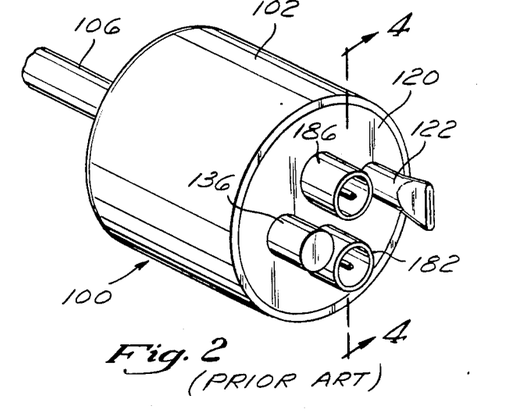
FIG. 2 is a perspective view of the assembled capacitance manometer of FIG. 1 showing the second end of the manometer with the two coaxial connectors, the getter enclosure and the pinched-off evacuation tube.
Figures 3, 5, 6, 7:
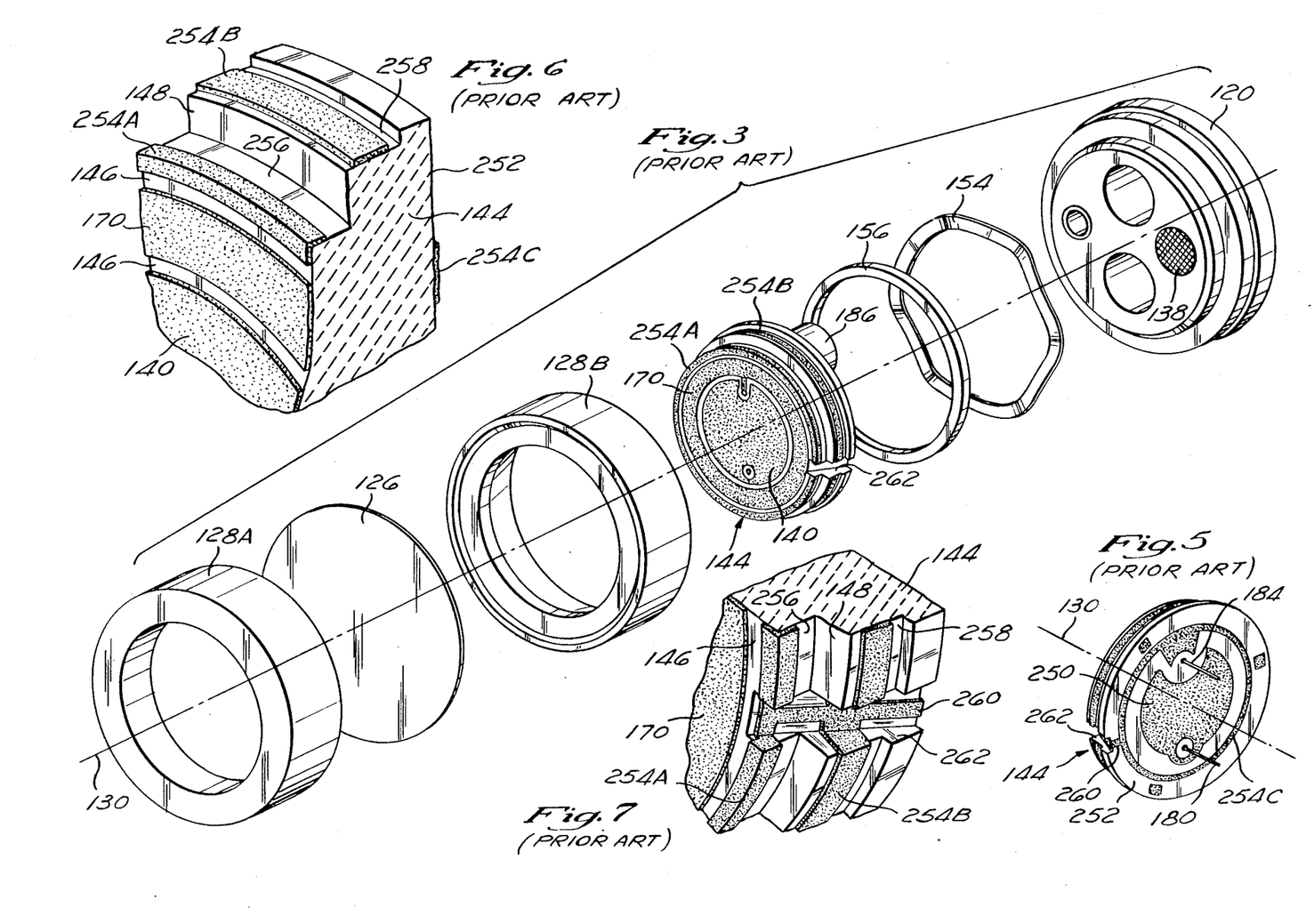
FIG. 3 is an exploded view of the capacitance manometer of FIGS. 1 and 2 showing the internal structure of the capacitance manometer, in particular the diaphragm, the diaphragm support structure, the fixed electrode support and the two fixed electrodes.
FIG. 5 is perspective view of the second surface of the fixed electrode support showing the guards positioned thereon.
FIG. 6 is a broken perspective view of the fixed electrode support of FIGS. 3 and 4 showing additional detail of the second guard.
FIG. 7 is a broken perspective view of the fixed electrode support of FIGS. 3 and 4 showing additional detail of the groove and the electrical conductor therein for interconnecting the three portions of the second guard.
Figure 4:
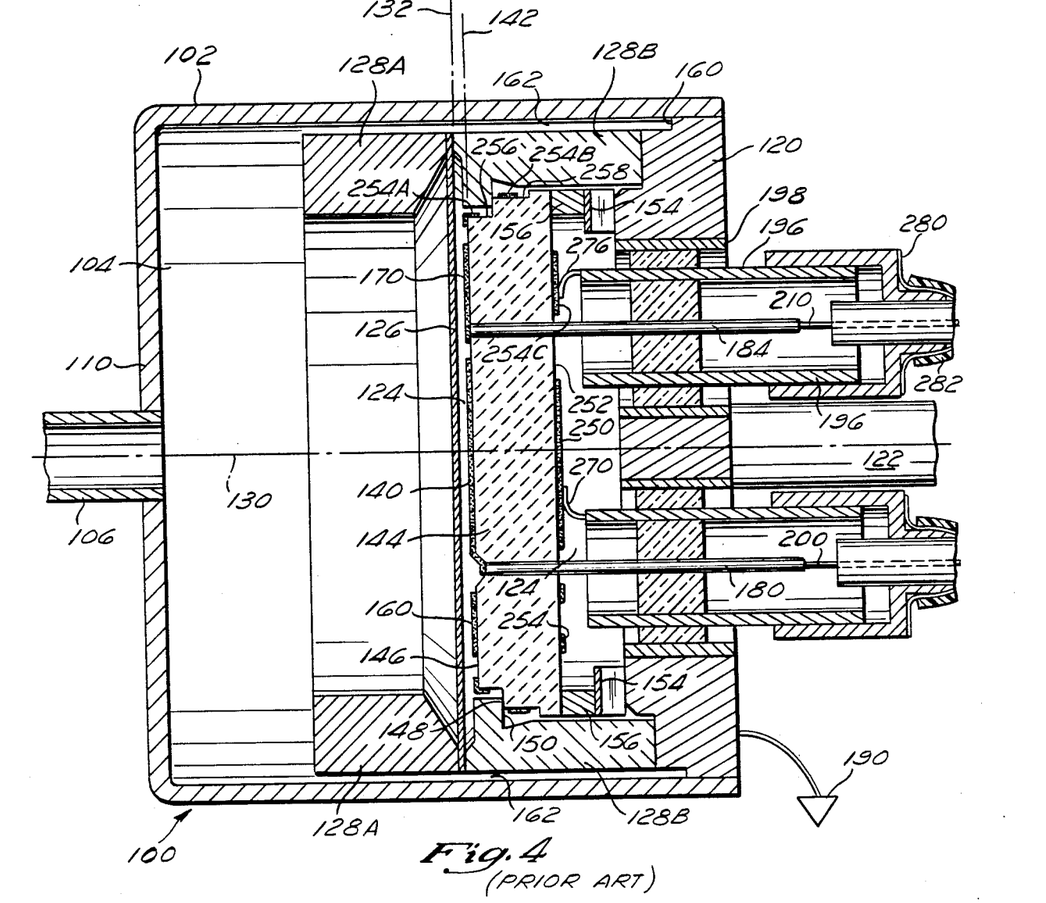
FIG. 4 is a cross-sectional view of the capacitance manometer taken along the lines 4—4 in FIG. 2 showing the positional relationships between the elements of the manometer.

FIGS. 1 and 2 illustrate a perspective view of the outside of an exemplary 100 Torr capacitance manometer 100 such as is presently commercially available. FIG. 3 is an explode perspective view of the interior portions of the capacitance manometer with the cover removed. FIG. 4 is a cross-sectional view of the assembled capacitance manometer of FIGS. 1 and 2. FIGS. 5-7 provide additional detailed views of the capacitance manometer. As illustrated, the capacitance manometer 100 includes a hollow pressure shell 102 which provides an air-tight enclosure of the capacitance manometer. Access to a first cavity 104 of the hollow pressure shell 102 is provided by a hollow pressure tube 106 which penetrates a first end 110 of the pressure shell 102. The pressure tube 104 is mechanically connected to the first end 110 of the pressure shell 102 by welding or another suitable method to provide a air tight seal between the pressure shell 102 and pressure tube 106. The pressure tube 106 is mechanically connectable to a source (not shown) of a pressure to be monitored by the capacitance manometer 100. For example, the pressure tube 106 may be welded to a vacuum line (not shown), or the like, so that the pressure in the vacuum line is applied to the first cavity 104 of the pressure shell 102.

As illustrated in FIGS. 2 and 4, the pressure shell 102 includes a second end 120 which is penetrated by a second pressure tube 122. The second pressure tube 122 provides access to a second cavity 124 of the pressure shell 102. The second cavity 124 of the pressure shell 102 is pneumatically isolated from the first cavity 104 by a thin, metallic diaphragm 126. As is well known in the art, the diaphragm 126 typically has a circular shape and is supported around its periphery by a support structure 128. The diaphragm 126 is connected to the support structure 128 by welding or other suitable means to provide a air tight seal around the periphery of the diaphragm 126. For example, the support structure 128 preferably comprises a first portion 128A and a second portion 128B which are welded together with the diaphragm sandwiched between them.

The diaphragm 126 is subjected to any pressure differential that may exist between the first cavity 104 and the second cavity 124 and will generally deform such that it is convex in the direction of the cavity having the lower pressure and concave in the direction of the cavity having the higher pressure. In typical capacitance manometers, the diaphragm 126 is circular and is symmetrical about an axis of symmetry 130. The axis of symmetry 130 is perpendicular to a plane 132 that corresponds to the undeflected (i.e., flat) condition of the diaphragm 126. The maximum deflection of the diaphragm 126 in response to a pressure differential is experienced by the central portion of the diaphragm 126 along the axis of symmetry 130. Thus, the direction of the deflection is perpendicular to the plane 132. Since the periphery of the diaphragm is secured to the support structure 128, it is substantially immovable in response to changes in the differential pressure. Thus, the portions of the diaphragm 126 which are closer to the periphery than to the center have substantially less movement than the center portion of the diaphragm 126.

The second pressure tube 122 is connectable, by welding or other means, to a source of a known reference pressure or to another pressure source to which it is desired to compare the pressure applied to the first pressure tube 106. Alternatively, and as is illustrated in FIGS. 2 and 4 the second pressure tube 122 is used to provide access to the second cavity 124 to subject the second cavity 124 to a known, fixed reference pressure. Thereafter, while maintaining the fixed reference pressure constant, the second pressure tube 122 is pinched off and permanently sealed so that the second cavity 124 is maintained at the fixed reference pressure. Thus, the pressure applied to the first pressure tube 106 is always compared to the known fixed reference pressure. The pressure applied to the second pressure tube 122 can be selected during the manufacturing process to provide capacitance manometers having selected operating ranges. For example, in order to measure very low pressures (i.e., subatmospheric pressures), the second cavity 124 is evacuated via the second pressure tube 122.

In typical capacitance manometers constructed in accordance with FIGS. 1-7, particularly those for measuring absolute pressures, the second end 120 may include a getter enclosure 136. The getter enclosure 136 houses a getter material (not shown) which is isolated from the second cavity 124 by a screen 138. The getter material removes traces of gas that remain after the second cavity 124 is evacuated and the second pressure tube 122 is closed. The removal of the residual gas is preferred so that it does not interfere with the accuracy of the pressure measurements.

The metallic diaphragm 126 is positioned proximate to a first fixed electrode 140. Preferably, the first fixed electrode 140 is generally circular and lies in a plane 142 parallel to the plane 132 and thus perpendicular to the axis of symmetry 130. The first fixed electrode 140 is mounted on a first surface 146 of a generally disc-shaped, electrically insulating fixed electrode support 144. The first surface 146 of the fixed electrode support 144 includes a shoulder 148 which rests upon a shoulder 150 of the support structure 128. The dimensions of the fixed electrode support shoulder 148 and the dimensions of the support structure shoulder 150 are selected so that the first fixed electrode 140 is held in a known fixed position with respect to the diaphragm 126. The fixed electrode support shoulder 148 is held securely in place against the support structure shoulder 150 by the action of a circular wave washer 154 against a thrust ring 156. Pressure is applied against the wave washer 154 and thus against the fixed electrode support 144 by the second end 120 of the pressure shell 102. The second end 120 of the pressure shell 102 is secured to the support structure 128 by welding or other suitable fastening means to provide an air tight seal. Typically, the inside diameter of the pressure shell 102 is larger than he outside diameter of the second end 120. The second end 120 also includes a shoulder 160 that has a diameter that is larger than the outside diameter of the support structure 128. The pressure shell 102 is welded to the shoulder of the second end 120 so that a small gap 162 remains between the outside of the support structure 128 and the inside of the pressure shell 102, thereby isolating the support structure 128 from the pressure shell 102. As illustrated, the fixed electrode support 144 is positioned within the second cavity 124. Typically, a small groove or other opening is formed in the fixed electrode support 144 to assure that the pressure is equalized on both sides of the fixed electrode support 144.

The diaphragm 126 and the first fixed electrode 140 comprise the two plates of a parallel plate capacitor with the space therebetween comprising the dielectric of the capacitor. For example, in exemplary capacitance manometers for measuring sub-atmospheric pressures, the dielectric constant of the space between the diaphragm 126 and the first fixed electrode 140 approaches the dielectric constant of a vacuum. It can be readily understood that the movement of the central portion of the diaphragm 126 along the axis of symmetry 130 toward and away from the first fixed electrode 140 causes the distance between the diaphragm 126 and the first fixed electrode to change and thus causes the capacitance between the two electrodes to change. Thus, the diaphragm 126 and the first fixed electrode 140 comprise a variable capacitor. The capacitance is monitored and changes in the pressure differential between the first cavity 104 and the second cavity 124 is determined from the changes in the measured capacitance.

Because there may be significant changes in the capacitance between the diaphragm 126 and the fixed electrode 140 caused by changes in temperature and other non-pressure changes, the measurement of capacitance changes is accomplished by providing two variable capacitors that change differently in response to pressure changes but which have substantially the same change in response to temperature changes and the like. For example, in U.S. Pat. No. 3,557,621, discussed above, the diaphragm positioned between first and second electrodes. Thus, as the diaphragm moves closer to the first fixed electrode in response to a change in the pressure differential and thus increases capacitance between the diaphragm and the first fixed electrode, the diaphragm moves farther away from the second fixed electrode and decreases the capacitance.

In contrast to the device shown in U.S. Pat. No. 3,557,621, in the device illustrated in FIGS. 1–7, a second fixed electrode 170 is provided by an electrically conductive annular ring 170 that is generally concentric with the first fixed electrode 140 and is spaced apart from the outer periphery of the first fixed electrode 140. The diaphragm 126 and the second fixed electrode 170 comprise a second variable capacitor. However, as discussed above, the movement of the diaphragm 126 in response to pressure changes is concentrated near the center of the diaphragm 126 (i.e., along the axis of symmetry 130). Thus, since the second fixed electrode 170 is positioned proximate to the outer portion of the diaphragm 126 rather than proximate to the central portion of the diaphragm 126, the capacitance between the diaphragm 126 and the second fixed electrode 170 experiences a substantially smaller change in capacitance relative to the change in capacitance between the diaphragm 126 and the first fixed electrode 140. Thus, the differential changes in capacitance are measured to determine the differential pressure changes. On the other hand, the capacitance between the second fixed electrode 170 and the diaphragm 126 and the capacitance between the first fixed electrode 140 and the diaphragm vary in approximately the same amount and the same direction (i.e., increasing or decreasing capacitance) in response to temperature changes and linear movement (i.e., movement of the two fixed electrodes towards and away from the diaphragm). This "common mode" change in capacitance can generally be ignored and is readily removed by known electronic circuits.

The first fixed electrode 140 is electrically connected to a conductor 180 which penetrates the fixed electrode support 144 and the second end 120. For example, as illustrated, the conductor 180 is advantageously the center conductor of a first hermetically-sealed coaxial connector 182 that is fastened to the second end 120 by welding or other suitable means to provide an air-tight seal. Similarly, the second fixed electrode 170 is electrically connected to a conductor 184 which also penetrates the fixed electrode support 144 and the second end 120. The second conductor 184 is advantageously the center conductor of a second hermetically-sealed coaxial connector 186 that is also fastened to the second end 120. Typically, the support structure 128, the second end 120, the pressure shell 102 and the first hollow pressure tube 106 comprise electrically conductive materials. Also typically, one or more of these elements is electrically connected to an electrical ground reference (shown schematically in FIG. 4 by a conventional ground symbol 190). Thus, an electrical connection is completed from the diaphragm 126 to the ground reference. In the embodiment shown, the first coaxial connector 182 includes a concentric outer conductor 192 that is spaced apart and electrically isolated from the center conductor 180 by an insulator 193 comprising glass or another suitable material that also provides a gas-tight seal between the two conductors. In order to electrically isolate the concentric outer conductor 192 from the second end 120 and thus from the ground reference, the first coaxial connector 182 preferably includes a concentric outer shell 194 which surrounds the portion of the outer conductor 192 that passes through the second end 120. The concentric outer shell 194 is spaced apart from and electrically isolated from the concentric outer conductor 192 by an insulator 195 that also is a gas-tight seal. Similarly, the second coaxial connector 186 includes a concentric outer conductor 196 spaced apart and electrically isolated from the center conductor 184 by an gas-tight insulator 197. A concentric outer shell 198 surrounds the outer conductor 196 and is spaced apart from the outer conductor 196 by a gas-tight insulator 199.

Figure 8:
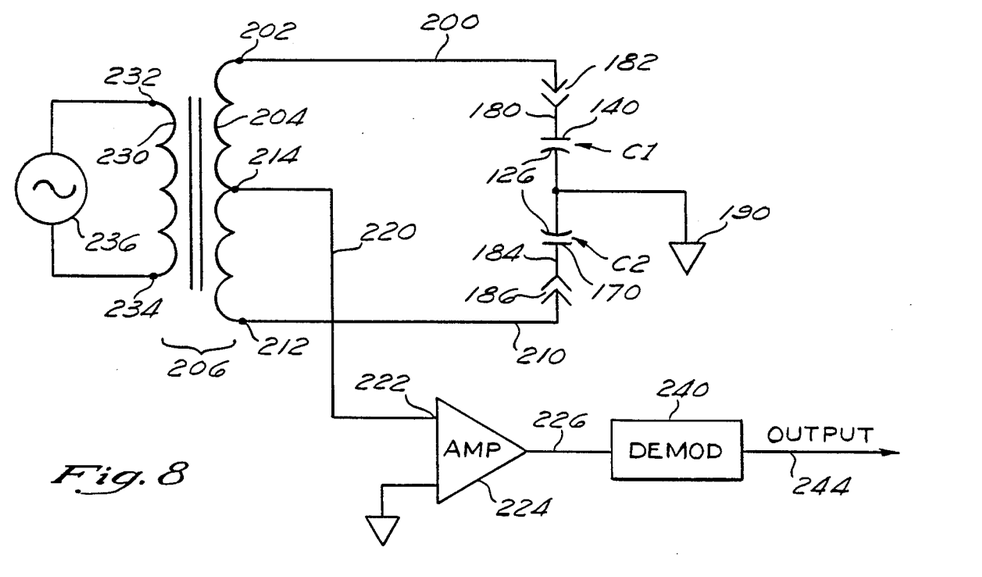
FIG. 8 is a schematic diagram of an exemplary electrical circuit incorporating the capacitance manometer used to explain the basic operation of the capacitance manometer to measure pressure changes.

An exemplary circuit that can be used in combination with the structure illustrated in FIGS. 1–7 is shown in FIG. 8. The circuit comprises a first capacitor $C_1$ and a second capacitor $C_2$. As illustrated, the first capacitor $C_1$ corresponds to the variable capacitance between the diaphragm 126 and the first fixed electrode 140. In like manner, the second capacitor $C_2$ corresponds to the variable capacitance between the diaphragm 126 and the second fixed electrode 170. The corresponding reference numerals for the diaphragm and the two fixed electrodes are shown in FIG. 8. The electrodes of the two capacitors corresponding to the diaphragm 126 are connected to the ground reference 190. The electrode 140 of the first capacitor $C_1$ is electrically connected via the conductor 180, the connector 182 and an electrical conductor 200 to a first terminal 202 of a secondary winding 204 of a transformer 206. The electrode 170 of the second capacitor $C_2$ is electrically connected via the conductor 184, the connector 186 and an electrical conductor 210 to a second terminal 212 of the secondary winding 204 of the transformer 206. The secondary winding 204 includes a center tap 214. An electrical conductor 220 connects the center tap 214 to an input 222 of an amplifier 224. The amplifier 224 preferably has a very high input impedance so that substantially zero current flows into the input 222. The amplifier 224 provides an output signal on an electrical conductor 226.

The transformer 206 has a primary winding 230 having a first input terminal 232 and a second input terminal 234. A high frequency signal source 236 is electrically connected to the primary winding via the first and second input terminals 232 and 234 so that the signal generated by the high frequency signal source 236 is applied to the primary winding. The applied signal is coupled to the secondary winding 204 and induces a high frequency voltage across the secondary winding 204. The induced voltage is applied to the first capacitor $C_1$ and the second capacitor $C_2$. It can be seen that the voltage across each of the two capacitors will be inversely proportional to the respective capacitances of the two capacitors and will thus vary in accordance with the deflection of the diaphragm 126 caused by differential pressure across the diaphragm 126. Since one electrode (i.e., the diaphragm electrode 126) of each of the two capacitors is electrically connected to the ground reference 190, the voltage differential will appear as a voltage differential between the first fixed electrode 140 of the first capacitor $C_1$ and the second fixed electrode 170 of the second capacitor $C_2$. This voltage differential causes a voltage to appear on the center tap 214 that is referenced to the ground reference 190 and that is proportional to the differences in the capacitance between the first capacitor $C_1$ and the second capacitor $C_2$. The voltage on the center tap 214 is applied via the conductor 220 to the input 222 of the amplifier 224. The amplifier 224 amplifies the center tap voltage an provides it as an output signal on the conductor 226. The output signal on the conductor 226 is a time-varying signal at the frequency of the signal source 236 with an amplitude that is proportional to the difference in capacitance. Since the capacitance of the first capacitor $C_1$ varies significantly in response to changes in the pressure differential and since the capacitance of the second capacitor $C_2$ varies relatively little in response to changes in the pressure differential, the amplitude of the time-varying signal output of the amplifier 224 changes in accordance with changes in the pressure differential across the diaphragm 126. The time-varying signal is demodulated by a conventional demodulator 240 to provide an output signal on a conductor 244 having a DC voltage level corresponding to the pressure differential across the diaphragm 126. For example, the demodulator 240 is advantageously a synchronous demodulator known to the art.

The foregoing description of the operation of the described exemplary prior art device assumes that the fixed electrode support is a perfect dielectric having no leakage currents. However, as discussed in U.S. Pat. No. 3,557,621, ambient humidity and other factors can cause leakage currents to flow between the fixed electrodes and other electrically conductive portions of the device. For example, in the described embodiment of FIGS. 1–7, a current leakage path may exist from the second fixed electrode 170 to the support structure 128 via the fixed electrode support shoulder 148 and the support structure shoulder 150 and thus to the ground reference 190. Since the secondary winding 204 of the transformer 206 is floating with respect to the ground reference 190, this leakage current must be provided through the transformer secondary winding 204 from the input 222 of the amplifier 224. Since the input impedance of the amplifier 224 is very high, supplying even a small amount of leakage current changes the voltage on the input to the amplifier 224 and thus results in an erroneous output signal from the output of the amplifier 224.

U.S. Pat. No. 3,557,621 describes a solution to the aforementioned problem with leakage currents in which an additional conductive member is positioned across the leakage path from one of the electrodes to the conductive portions of the support structure. An implementation of the solution described in the patent is illustrated in the device of FIGS. 1–7. As shown most clearly in FIG. 6, a first electrically conductive guard 250 having dimensions that are similar to the dimensions of the first fixed electrode 140 is positioned on the fixed electrode support 144 on a second surface 252 of the fixed electrode support 144. The second surface 252 is opposite the first surface 146 and the first guard 250 is positioned in approximate alignment with the first fixed electrode 140. It can be seen that a leakage path from the first fixed electrode 140 to the second end 120, for example, will cross the first guard 250. In order to block the leakage path to prevent the leakage current from continuing to flow toward the second end 120, a voltage potential equal to the voltage of the first fixed electrode 140 is applied to the first guard 250. Similarly, a second guard 254 is provided to block leakage currents from the second fixed electrode 170. In the exemplary device illustrated in FIGS. 1–7, the second guard 254 comprises first, second and third separate but electrically interconnected guard rings 254A, 254B and 254C. The first guard ring 254A is positioned on the first surface 146 and an adjacent peripheral surface 256 between the first surface 146 and the fixed electrode support shoulder 148. The second guard ring 254B is positioned on an outer peripheral surface 258. The third guard ring 254C is positioned on the second surface 252 opposite the second fixed electrode 70. The three guard rings 254A, 254B, and 254C are interconnected by an electrical interconnection 260, which, in an exemplary embodiment of this device, comprise metallization in a groove 262 in the periphery of fixed electrode support 144. A voltage having substantially the same magnitude as the voltage on the second fixed electrode 170 is applied to the second guard 254. Thus, the second guard 254 operates to block leakage currents from the second fixed electrode 170 to adjacent portions of the support structure 128 and the second end 120. As illustrated, the second guard 254 is not continuous, as the fixed electrode support shoulder 148 is in mechanical contact with the support structure shoulder 150 and thus would cause an electrical connection if the second guard 254 was positioned on the shoulder. Similarly, the second guard 254 is not on the peripheral edges of the second surface 252 proximate to the thrust ring 156 to prevent any electrical connection thereto.

Figure 9:
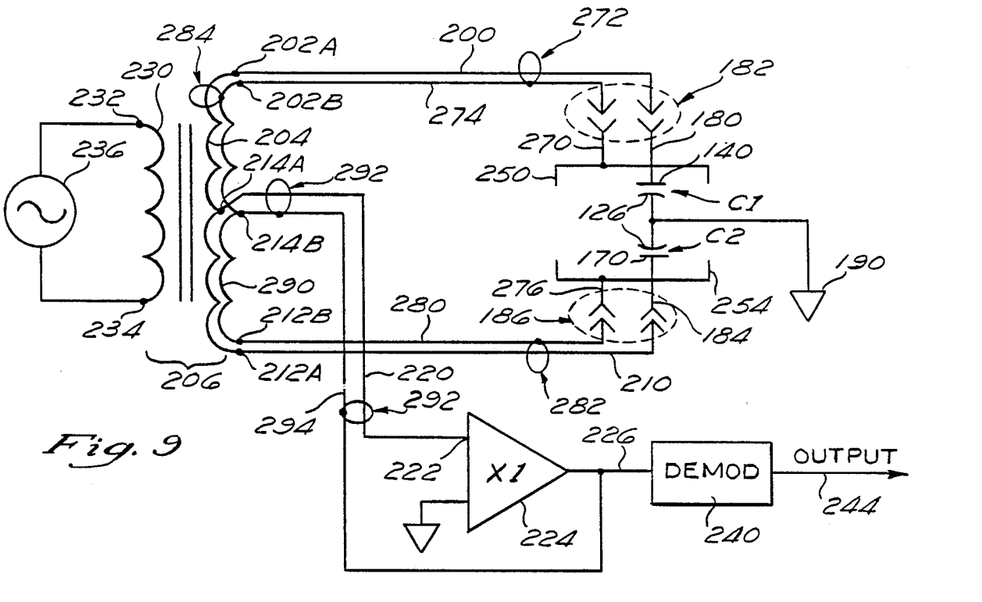
FIG. 9 is a schematic diagram of an exemplary improved electrical circuit used in cooperation with the guard ring electrodes on the fixed electrode support to provide electrical guarding against current leakage caused by stray capacitances in the fixed electrode support.

An exemplary electrical circuit for providing the appropriate voltage to the first guard ring 250 and the second guard ring 254 is illustrated in FIG. 9. In FIG. 9, elements corresponding to the elements of FIG. 8 are labelled as before. In addition, schematic representations of the first guard 250 and the second guard 254 are shown proximate to the first fixed electrode 140 and the second fixed electrode 170, respectively. The first guard 250 is interconnected via a first tab 270 (see FIG. 4), or the like, which is electrically connected to the concentric outer conductor 192 of the first coaxial connector 182. In the electrical circuit of FIG. 9, the electrical conductor 200 is the center conductor 200 of a first coaxial cable 272 that includes an concentric outer conductor 274 that surrounds the center conductor 200. Thus, the concentric outer conductor 192 of the first coaxial connector 182 is electrically connected to the concentric outer conductor 274 of the first coaxial cable 272. In like manner, the second guard 254 is interconnected via a second tab 276 which is electrically connected to the outer conductor 196 of the second coaxial connector 186. The outer conductor 196 is in turn electrically connected to a concentric outer conductor 280 around the electrical conductor 210 which is the center conductor 210 of a second coaxial cable 282.

In FIG. 9, the first terminal 202, the second terminal 212 and the center tap 214 each comprise an A portion and a B portion. The two center conductors 200 and 210 are connected to the first terminal 202A and the second terminal 212A of the secondary winding 204 of the transformer 206, which, in FIG. 9, is the center conductor of a third coaxial cable 284. The third or secondary winding coaxial cable 284 has an outer conductor 290 which is concentric with the inner conductor 204. The outer conductor 290 of the secondary winding coaxial cable 284 is electrically connected at the first terminal 202B with the outer conductor 274 of the first coaxial cable 272, and is electrically connected at the second terminal 212B with the outer conductor 280 of the second coaxial cable 282. The inner conductor 204 and the outer conductor 290 of secondary winding coaxial cable 284 are both subjected to the field induced by the primary winding. The inner conductor 204 and the outer conductor 290 of the secondary winding coaxial cable 284 are center tapped at the center taps 214A and 214B. The center tap 214A of the inner conductor 204 of the secondary winding coaxial cable 284 is electrically connected to the conductor 220, which is preferably the center conductor 220 of a fourth coaxial cable 292 having an outer conductor 294. The center tap 214B of the outer conductor 290 of the secondary winding coaxial cable 284 is electrically connected to the outer conductor 294 of the coaxial cable 292.

The inner conductor 220 of the fourth coaxial cable 292 is electrically connected to the input terminal 222 of the amplifier 224, which, in FIG. 9, is shown as a times 1 (×1) amplifier. In other words, the output of the amplifier 224 on the line 226 tracks the input voltage on the input terminal 222. The line 226 is connected to the input of the demodulator 240 as before. In addition, the line 226 is electrically connected to the outer conductor 294 of the fourth coaxial cable 292 and thus to the outer conductor 290 of the secondary winding coaxial cable 284 at the center tap 214B.

The operation of the circuit of FIG. 9 is substantially the same as the operation of the circuit of FIG. 8. However, the use of the coaxial cable 284 in the secondary winding and the application of the same voltage to the outer conductor 290 as on the inner conductor 204 assures that the voltage on the first guard 250 is substantially identical to the voltage on the first fixed electrode 140 and that the voltage on the second guard 254 is substantially identical to the voltage on the second fixed electrode 170. Thus, leakage currents to and from the fixed electrodes in the fixed electrode support 144 are provided by the respective guards. Since the output of the amplifier 224 is a relatively low impedance output, the small leakage currents which it must source or sink do not have any significant effect on the voltage on the line 226. Thus, the circuit of FIG. 9, in combination with the first guard 250 and the second guard 254 has been found to significantly reduce the effect of the leakage currents on the accuracy of the capacitance manometers constructed in accordance with FIGS. 1–7. For example, the stray capacitances associated with the leakage currents have been reduced from approximately 15 picofarads to approximately one picofarad. The capacitance between the first fixed electrode 140 and the diaphragm 126 is nominally around 30 picofarads, so it can be seen that the shielding effect provided by the first guard 250 and the second guard 254 is very beneficial.

DESCRIPTION OF THE PROBLEMS SOLVED BY THE PRESENT INVENTION

Although the capacitance manometer described above provides accurate measurements of pressure changes, it has been found that there is a need to measure smaller and smaller incremental changes in pressure. For example, devices have been constructed in which the pressures to be measured are in a range around 0.001 atmosphere. In order to measure pressures in this range it is necessary to evacuate the second cavity 124 to a pressure in the range to be measured. In these very low measurement ranges, the changes in capacitance caused by the movement of the diaphragm are very small and it has been found that the one picofarad of residual stray capacitance is sufficient to interfere with accurate measurements. For example, in the device described above, there exists a small leakage path at the juncture of the fixed electrode support shoulder 148 and the support structure shoulder 150. Thus, a need exists to further reduce the stray capacitances and the associated leakage currents.

Another problem associated with the above-described capacitance manometer results from the use of the ceramic fixed electrode support 144 in combination with the metallic support structure 128. The fixed electrode support 144 has a different coefficient of thermal expansion than the support structure 128. Thus, as the ambient temperature of the capacitance manometer varies, the fixed electrode support 144 and the support structure 128 will expand and contract at different rates. Because of this differential expansion and contraction, it is necessary that slippage occur at the juncture of the fixed electrode support shoulder 148 with the support structure shoulder 150 around the periphery of the fixed electrode support 144. However, because of the pressure applied to the support structure 128 by the wave washer 154, the friction forces at the juncture are quite large. Thus, a considerable amount of differential expansion or contraction may occur before slip occurs at the juncture around the periphery of the fixed electrode support 144, resulting in bending of the fixed electrode support 144 when the support structure 128 contracts at a faster rate than the fixed electrode support 144 or flattening of the fixed electrode support 144 when the support structure 128 expands at a faster rate than the fixed electrode support 144. Although the bending caused by temperature is relatively small, the changes in capacitance are comparable to changes in capacitance caused by the small pressure changes to be measured. Although attempts have been made to include temperature compensation in the electrical circuitry or to factor the temperature changes into calculation of the measured pressure, such attempts generally have not been entirely successful. One reason for the lack of success is the fact that the movement of the fixed electrode support shoulder 148 relative to the support structure shoulder 150 includes mechanical hysteresis caused by the friction between the two shoulders. That is, the amount of relative bending of the fixed electrode support shoulder 148 with respect to the support structure shoulder 150 when the temperature changes by a given amount in one direction is not necessarily the same amount of relative movement when the temperature returns to the original temperature. The amount of bending cannot be predicted based upon measured temperature changes, and therefore cannot be readily compensated. Thus, a need exists for eliminating the frictional forces between the two shoulders.

DESCRIPTION OF THE PRESENT INVENTION

Figures 10, 11, 13:
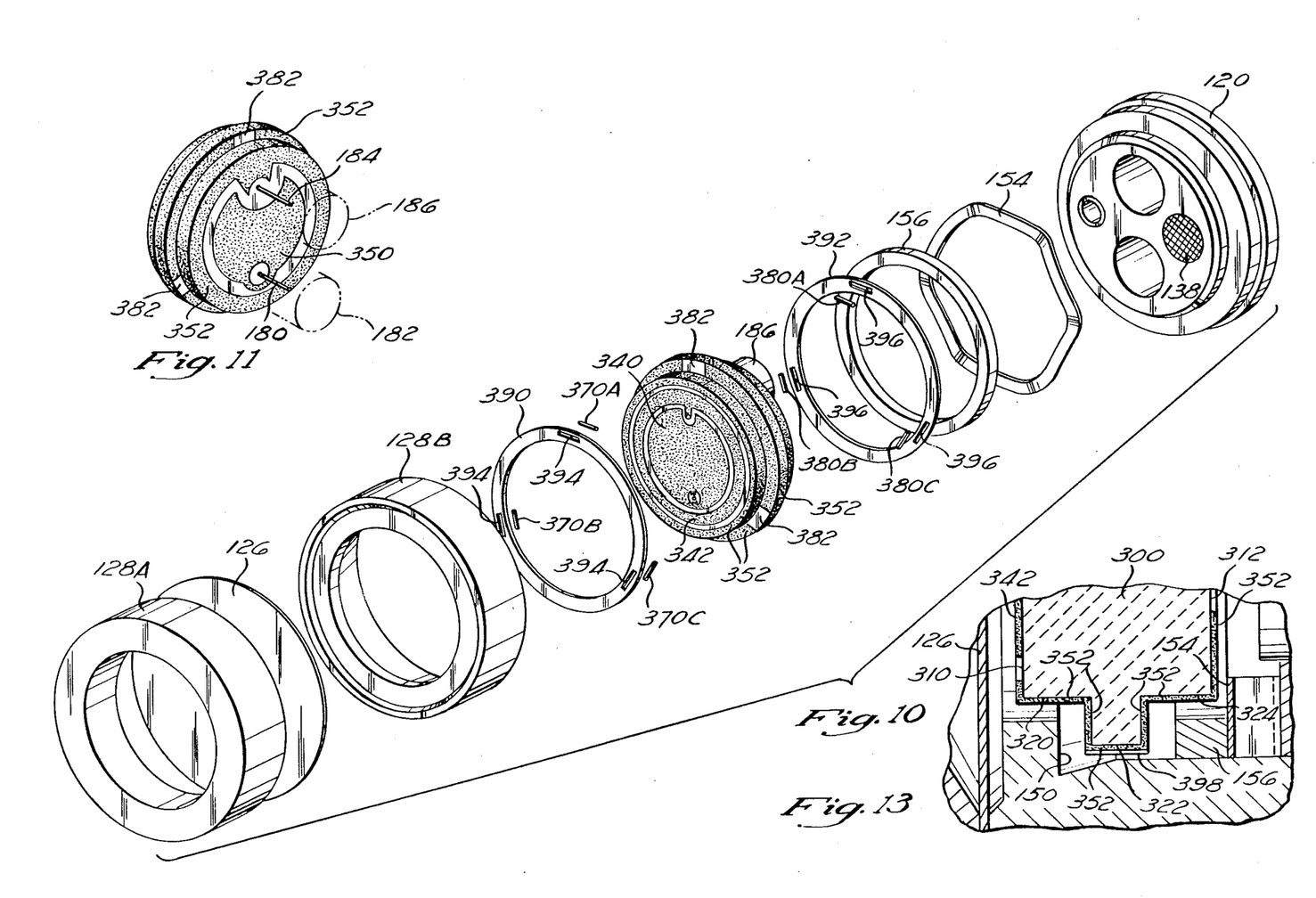
FIG. 10 is an exploded perspective view of the present invention which includes roller bearings to mechanically and electrically isolate the fixed electrode support from the diaphragm support structure.
FIG. 11 is a perspective view of the second surface of the fixed electrode support of the present invention showing the positioning of the first and second guards on the second surface.
FIG. 13 is an enlarged partial cross-sectional view of the present invention showing additional detail of the second guard and the layer of glass insulating the second guard on the first, second and third peripheral surfaces of the fixed electrode support.
Figure 12:
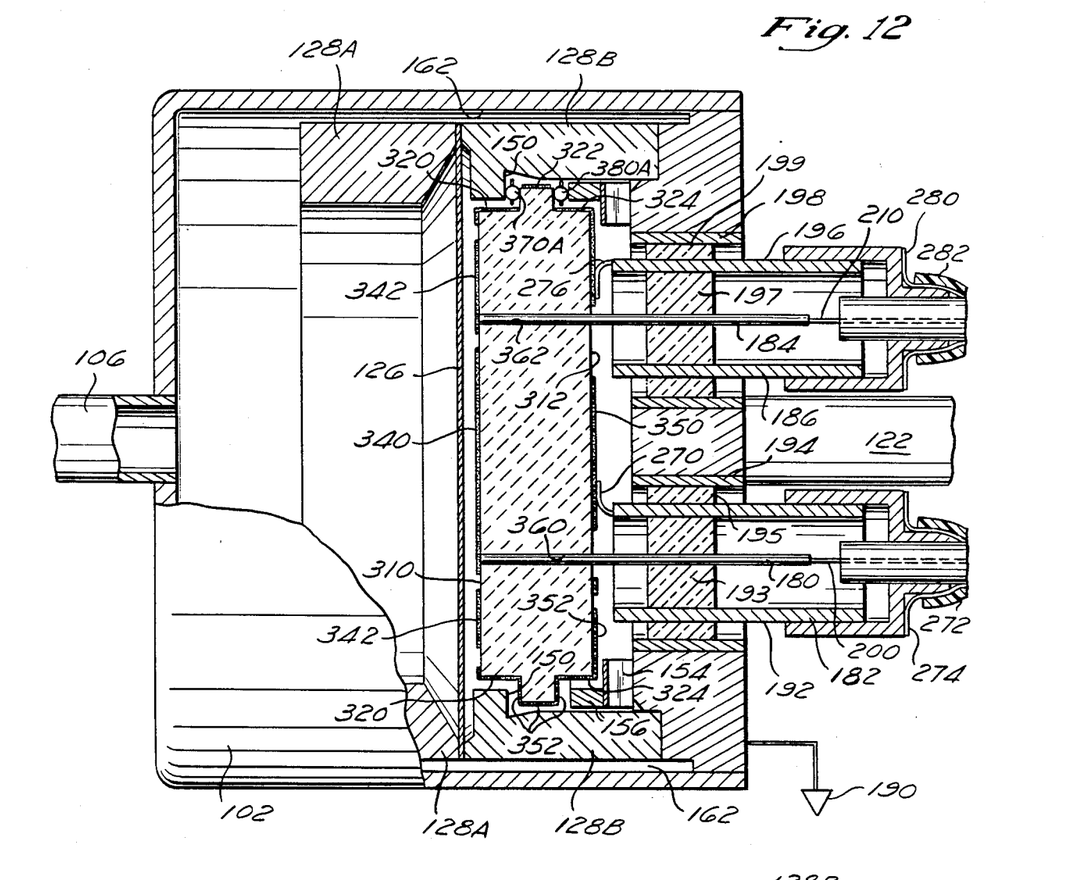
FIG. 12 is a cross-sectional view of the present invention showing the positioning of the roller bearings with respect to the fixed electrode support and the support structure.
Figures 14, 15:
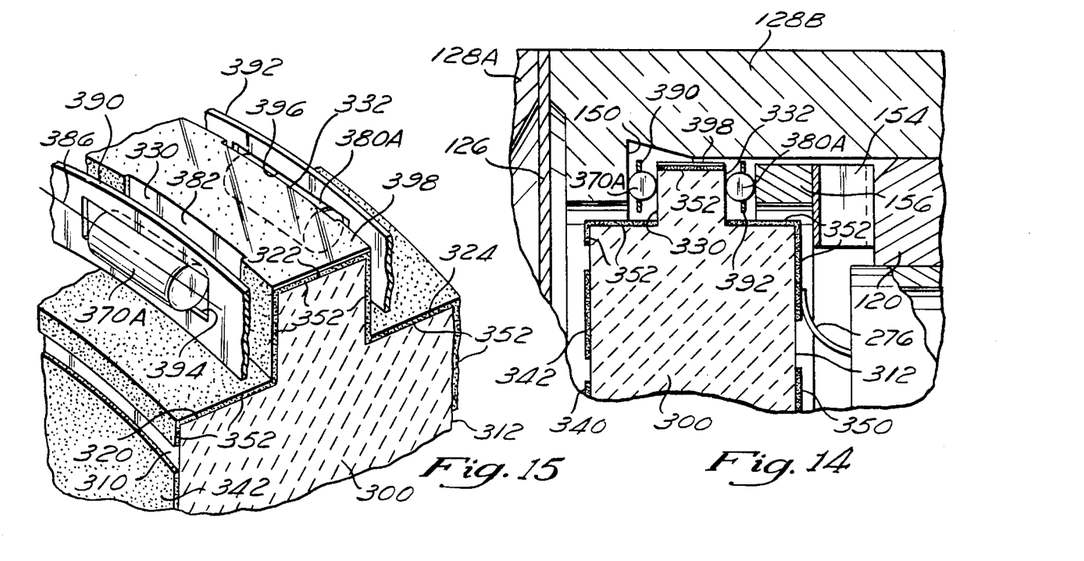
FIG. 14 is an enlarged partial cross-sectional view of the present invention showing additional detail of a roller bearing in position between the first fixed electrode support shoulder and the diaphragm support structure shoulder and showing additional detail of a roller bearing in position between the second fixed electrode support shoulder and the thrust ring.
FIG. 15 is an enlarged broken perspective view of the present invention showing additional detail of the positions of the roller bearings with respect to the unguarded roller contact areas on the first and second dielectric support shoulders, and also showing additional detail of the bearing retainer rings.

The preferred embodiment of the present invention is illustrated in FIGS. 10–15. FIG. 10 is an exploded perspective view of the structural elements of the present invention showing an improved fixed electrode support. FIG. 11 is a perspective view of the second surface of the fixed electrode support. FIG. 12 is a cross-sectional view of the completed assembly showing the positioning of the elements with respect to each other. FIGS. 13 and 14 are enlarged partial cross-sectional views of the present invention. FIG. 15 is an enlarged partial perspective view of the present invention. The elements of the present invention that are the same or substantially similar to the elements of the previously described device have been labelled with the same numeric designators as before.

As illustrated, the support structure 128 and the diaphragm 126 are constructed substantially as described above. The present invention includes an improved fixed electrode support structure 300. The fixed electrode support 300 comprises a circular disc of ceramic or other suitable insulator having a first substantially flat surface 310 and a second substantially flat surface 312.

The circular outer periphery of the fixed electrode support 300 comprises a first peripheral surface 320, a second peripheral surface 322 and a third peripheral surface 324. The circumference of the fixed electrode support 300 around the first peripheral surface 320 and the circumference around the third peripheral surface 324 are less than the circumference around the second peripheral surface 322 so that a first fixed electrode support shoulder 330 is defined between the first peripheral surface 320 and the second peripheral surface 322 and so that a second fixed electrode support shoulder 332 is defined between the second peripheral surface 322 and the third peripheral surface 324. The first fixed electrode support shoulder 330 and the second fixed electrode support shoulder 332 are flat and define planes substantially parallel to the first flat surface 310 and the second flat surface 312.

A first fixed electrode 340 comprising an electrically conductive material is positioned on the first flat surface 310 of the fixed electrode support 300 and is substantially in the center of the first flat surface 310. A second fixed electrode 342 comprising an annular ring of electrically conductive material is positioned on the first flat surface 310 and is substantially concentric with the first fixed electrode 340. A first electrically conductive guard 350 is positioned substantially in the center of the second flat surface 312 of the fixed electrode support 300 opposite the first fixed electrode 340. A second electrically conductive guard 352 is positioned on the first flat surface 310 adjacent to and spaced apart from the second fixed electrode 342 so that the second guard 352 forms an annular ring around the second fixed electrode 342. The second guard 352 continues onto the first peripheral surface 320, onto the first shoulder 330, onto the second peripheral surface 322, onto the second shoulder 332, onto the third peripheral surface 324, and then onto the second flat surface 312. The portion of the second guard 352 on the second flat surface 312 forms an annular ring around and spaced apart from the first guard 350. In preferred embodiments of the invention, the electrically conductive material of the fixed electrodes and the guards is silver which is plated onto the fixed electrode support 300 by conventional methods.

The first fixed electrode 340 is electrically connected to a first electrically conductive feed through or via 360 that penetrates the fixed electrode support 300. The via 360 provides an electrical connection to the center conductor 180 of the first coaxial connector 182. For example, the center conductor 180 may extend through the via 360 and be electrically connected to the first fixed electrode 340 by soldering or other conventional means. Similarly, a second electrically conductive via 362 is provided to electrically interconnect the second fixed electrode 342 with the center conductor 184 of the second coaxial connector 186. The first tab 270 of the first coaxial connector 182 is electrically connected to the first guard 350, and the second tab 276 of the second coaxial connector 186 is electrically connected to the second guard 352.

It should be noted that although the fixed electrodes and the guards have been described as circular or annular, they are not entirely circular so as to accommodate the vias 360 and 362 and the electrical connections to the vias.

Referring now in particular to the cross-sectional view of FIG. 12, it can be seen that the first fixed electrode support shoulder 330 does not contact the support structure shoulder 150 as in the exemplary known capacitance manometer described above. Rather, the first fixed electrode support shoulder 330 is spaced apart from the support structure shoulder 150 by a first set of rolling bearings 370. The first set of roller bearings 370 advantageously comprise an electrically insulating material such as industrial sapphire (crystalline aluminum oxide, $Al_2O_3$) or other suitable material having similar hardness and electrical insulating characteristics. The first set of roller bearings 370 are spaced apart around the first fixed electrode support shoulder 330. For example, in the exemplary preferred embodiment described herein, the first set of rolling bearings comprises three roller bearings 370A, 370B and 370C that are spaced apart from each other by equal distances and are thus positioned 120 degrees apart along the first fixed electrode support shoulder 330. The diameters of the first three roller bearings 370A, 370B and 370C are selected to be substantially equal so that the fixed electrode support shoulder 330 is spaced apart from the support structure shoulder 150 by an equal distance by each of the three roller bearings 370A, 370B and 370C, thus assuring that the first surface 310 of the fixed electrode support 300 is in a plane parallel to the plane of the diaphragm 126.

The present invention further includes a second set of roller bearings 380 which are positioned on the second fixed electrode support shoulder 332 between the second fixed electrode support shoulder and the thrust ring 156. The second set of roller bearings 380 advantageously includes three roller bearings 380A, 380B and 380C, which are spaced apart around the second support shoulder 332 by equal distance (i.e., they are positioned at angles of 120 degrees with respect to each other). The second set of roller bearings 380 also advantageously comprise a hard crystalline insulating material such as sapphire.

When the second end 120 is secured to the support structure 128, pressure is applied to the thrust ring 156 via the wave washer 154 and thus to the second set of roller bearings 380, the fixed electrode support 300 and the first set of roller bearings 370. The hard crystalline material of the first set of roller bearings 370 and the second set of roller bearings 380 does not readily deform under the pressure applied via the wave washer 154. Thus, the two sets of roller bearings 370, 380 substantially prevent movement of the fixed electrode support 300 in the direction perpendicular to the plane of the diaphragm 126.

Since a substantial amount of pressure is applied to the first fixed electrode support shoulder 330 and the second fixed electrode support shoulder 332 by the first set of roller bearings 370 and the second set of roller bearings 380, respectively, in the preferred embodiments of the present invention, a plurality of small areas 382 of the second guard 352 is removed on the first fixed electrode support shoulder 330 and the second support shoulder 332 where the roller bearings 370, 380 contact the shoulders 330, 332. Thus, the pressure applied by the roller bearings 370, 380 is applied directly to the hard surface of the ceramic fixed electrode support 330 rather than to the relatively soft silver material of the second guard 352.

Preferably, the roller bearings 370 and 380 have a cylindrical shape as illustrated in FIGS. 12, 14 and 15. Alternatively, the roller bearings 370 and 380 may have a spherical shape, as in a conventional ball bearing. In the preferred cylindrical embodiment, each of the roller bearings 370, 380 has a longitudinal axis 386 which is oriented perpendicular to a radial extending from the center of the fixed electrode support 300. The roller bearing 370, 380 will roll radially inward and outward and allow free movement of the fixed electrode support 300 relative to support structure shoulder 150 and with respect to the thrust ring 156. Thus, when there is differential expansion and contraction of the fixed electrode support 330 and the support structure 128 caused by temperature changes, the relative movement between the fixed electrode support 330 and the support structure 128 provided by the roller bearings 370, 380 prevent the bowing associated with the above-described prior art device. Therefore, the unpredictable changes in capacitance caused by the bending are substantially reduced or eliminated by the roller bearings 370, 380.

In preferred embodiments of the present invention, a first bearing retainer 390 is provided for the first set of roller bearings 370 and a second bearing retainer 392 is provided for the second set of roller bearings 380. The first bearing retainer 390 is a thin annular ring of metal or other suitable material having an opening 394 for each of the roller bearings 370. In the preferred embodiment, the first bearing retainer 390 has three openings 394 which are positioned 120 degrees apart around the first bearing retainer 390 so that the roller bearings are positioned equidistantly apart from each other as described above. In the embodiment shown, the openings 394 of the first bearing retainer 390 are rectangular to accommodate the cylindrical roller bearings 370 of the preferred embodiment. The second bearing retainer 392 has a similar construction with three rectangular openings 396. It should be understood that in the alternative spherical embodiment of the roller bearings (not shown), the first and second bearing retainers 390 and 392 will have appropriately sized circular openings to accommodate the spherical shape.

As set forth above, the roller bearings 370, 380 of the present invention substantially reduce or eliminate the changes in capacitance caused by expansion and contraction with temperature changes. In addition, it has been found that the roller bearings 370, 380 provide a significant reduction in the residual stray capacitances in the fixed electrode support 330 caused by leakage currents between the first fixed electrode 340, the second fixed electrode 342 and the metallic parts of the support structure 128. As was discussed above, it was necessary in the prior art device to have direct contact between the fixed electrode support shoulder 148 (FIG. 4) and the support structure shoulder 150. Thus, the second guard 254 (i.e., the guard portions 254A, 254B and 254C) of the prior art device (FIG. 4) did not include a second guard portion on the fixed electrode support shoulder 148. This had the effect of interrupting the shielding provided by the second guard 254 and of also providing an electrical connection to the support structure shoulder 150. The shoulder-to-shoulder electrical connection of the prior device provides a path for the leakage currents and the support structure shoulder 150 thus acts as the electrode of a small stray capacitance.

In the present invention, the roller bearings 370, 380 provide two basis for eliminating the leakage currents and thus the stray capacitances. First, it can be seen that the second guard 352 of the present invention is effectively continuous from the first surface 310 to the second surface 312 except for the six very small areas 382 which contact the roller bearings 370, 380. Thus, the potential leakage paths to each of the adjacent portions of the support structure 128 and the second end 120 are effectively blocked by either the first guard 350 or the second guard 352. In addition, at the six small areas 382, the fixed electrode support 330 is electrically isolated from the support structure shoulder 150 by the insulating characteristics of the first set of roller bearings 370 and is electrically isolated from the thrust ring 156 by the insulating characteristics of the second set of roller bearings 380.

It is believed that the roller bearings 370 and 380 of the present invention provide approximately a magnitude reduction in the stray capacitance from approximately one picofarad in the exemplary prior art device to approximately 0.1 picofarad in a device constructed in accordance with the present invention.

Referring to the detailed cross-sectional views in FIGS. 13 and 14 and the broken perspective view in FIG. 15, it can be seen that the second peripheral surface 322 is electrically insulated by adding a thin coating of glass 398 on top of the silver second guard 352. The insulating glass coating 398 is advantageously included to permit the fixed electrode support 300 to be centered in contact with the support structure 128 without electrical contact between the second guard 352 and the support structure 128.

Although described above in connection with the preferred embodiment, it should be apparent to one skilled in the art that certain modifications to the described invention can be made without going beyond the spirit and scope of the invention. For example, the roller bearings can comprise other materials, such as an electrically conductive metal. In such embodiments (not shown), an insulating insert, comprising sapphire, for example, is provided in the adjacent portion of the first and second fixed electrode support shoulders 330 and 332 to provide the electrical insulating characteristics to electrically isolate the fixed electrode support shoulders 330 and 332 from the support structure shoulder 150 and the thrust ring 156, respectively. Thus, the scope of the present invention is limited only in accordance with the appended claims.

What is claimed is:

1. A variable capacitance measuring device responsive to a variable parameter, said measuring device comprising:
   a variable capacitor, said variable capacitor comprising:
      a first electrically conductive element comprising a first electrode of said variable capacitor, at least a portion of said first electrode movable in a first direction in response to variations in said variable parameter; and
      a second electrically conductive element comprising a second electrode of said variable capacitor; and
   rolling means for mounting said second electrode proximate to said first electrode so that said second electrode is substantially immovable in said first direction with respect to said first electrode and so that said second electrode is movable in a second direction perpendicular to said first direction.

2. The variable capacitance measuring device as defined in claim 1, wherein said variable parameter is differential pressure between a reference pressure and an unknown pressure, and wherein said first electrode comprises a diaphragm having first and second sides, said diaphragm positioned so that said reference pressure is on said first side of said diaphragm and said unknown pressure is on said second side of said diaphragm, at least a portion of said diaphragm being movable in said first direction in response to changes in said pressure differential.

3. The variable capacitance measuring device as defined in claim 1, further comprising:
   a housing, said housing having a mounting surface therein; and
   an insulating support within said housing, said insulating support having a first surface on which said second electrode is secured,
   said rolling means for mounting said second electrode proximate to said first electrode comprising a roller bearing interposed between said insulating support and said mounting surface of said housing, the position of said roller bearing selected so that:
      said insulating support is substantially immovable with respect to said mounting surface of said housing in said first direction; and
      said insulating support is movable with respect to said mounting surface in said second direction.

4. A variable capacitance measuring device responsive to a variable parameter, said measuring device comprising:
   a housing;
   a first electrode secured to said housing, said first electrode reciprocally movable along a first axis within said housing in response to changes in said variable parameter;
   a second electrode within said housing, said second electrode spaced apart from said first electrode so that said first and second electrodes form a capacitor;
   an insulator, said insulator having a surface on which said second electrode is mounted; and
   a roller bearing interposed between said insulator and said housing, said roller bearing positioned so that said insulator and said second electrode are immovable with respect to said first electrode in a direction along said first axis, said roller bearing permitting movement of said second electrode and said insulator in a plane perpendicular to said first axis.

5. The variable capacitance measuring device as defined in claim 4,
   wherein said first electrode comprises a diaphragm secured to said housing, said diaphragm separating a first region within said housing having a first pressure from a second region within said housing having a second pressure;
   wherein said variable parameter is a differential pressure between said first and second regions; and
   wherein at least a portion of said diaphragm moves along said first axis in a direction toward said second electrode when one of said first and second pressures increases relative to the other of said first and second pressures and said portion of said diaphragm moves along said first axis in a direction away from said diaphragm when said one of said first and second pressures decreases relative to the other of said first and second pressures.

6. A variable capacitance manometer for measuring changes in pressure, said manometer comprising:
   an electrically conductive housing, said housing comprising a material having a first coefficient of thermal expansion;
   a diaphragm mechanically and electrically coupled to said housing, said diaphragm separating said housing into first and second pneumatically isolated pressure chambers, said first pressure chamber having a first pressure and said second pressure chamber having a second pressure that is variable relative to said first pressure thereby providing a pressure differential between the first and second chambers, said diaphragm having a portion thereof movable in a first direction along an axis toward one of said first and second chambers when said pressure differential increases and movable in a second direction along said axis away from said one of said first and second pressure chambers when said pressure differential increases, said diaphragm being the first electrode of a variable capacitor;
   a second electrode of said variable capacitor positioned within one of said first and second pressure chambers proximate to said diaphragm, said second electrode spaced apart from said portion of said diaphragm by a distance that varies in response to changes in said pressure differential between said first and second pressure chambers;

an insulating support that supports said second electrode in a fixed position in said housing in a plane perpendicular to said axis, said insulating support comprising a material having a second coefficient of thermal expansion different from said first coefficient of thermal expansion; and roller bearings interposed between said insulating support and said housing, said roller bearings positioned to prevent movement of said insulating support in a direction perpendicular to said plane while allowing movement of said insulating support in a direction within said plane.

7. The variable capacitance manometer as defined in claim 6, wherein said roller bearings comprise an electrical insulator to provide electrical isolation between said insulating support and said electrically conductive housing.

8. The variable capacitance manometer as defined in claim 7, wherein said roller bearings comprise sapphire.

9. The variable capacitance manometer as defined in claim 6, wherein said roller bearings are spherical.

10. The variable capacitance manometer as defined in claim 6, wherein said roller bearings are cylindrical.

11. A variable capacitance manometer for measuring a difference in first and second pressures, said variable capacitance manometer comprising:

a housing;

a fixed electrically conductive electrode positioned within said housing, said fixed electrically conductive electrode forming a first electrode of a variable capacitor;

an electrically conductive diaphragm within said housing, said diaphragm forming a second electrode of said variable capacitor, said diaphragm having two sides, one of said first and second sides subjected to one of said two pressures, the other of said first and second sides subjected to the other of said two pressures, a portion of said diaphragm movable in response to changes in a pressure differential between said two pressures thereby changing the capacitance between said diaphragm and said fixed electrode;

an insulator that supports said fixed electrode within said housing; and a set of roller bearings interposed between said insulator and said housing, said roller bearings positioned to prevent movement of said insulator in a first direction toward said diaphragm and to permit movement of said insulator in a plane perpendicular to said first direction.

12. The capacitance manometer as defined in claim 11, wherein said roller bearings are spherical.

13. The capacitance manometer as defined in claim 12, wherein said roller bearings comprise an electrically insulating material.

14. The capacitance manometer as defined in claim 13, wherein said roller bearings comprise sapphire.

15. The capacitance manometer as defined in claim 11, wherein said roller bearings are cylindrical.

16. The capacitance manometer as defined in claim 15, wherein said roller bearings comprise an electrically insulating material.

17. The capacitance manometer as defined in claim 16, wherein said roller bearings comprise sapphire.

* * * * *